(12) United States Patent  
Stone et al.

(10) Patent No.: US 7,391,780 B1  
(45) Date of Patent: Jun. 24, 2008

(54) METHOD AND APPARATUS FOR STATISTICAL PREDICTION OF ACCESS BANDWIDTH ON AN XDSL NETWORK

(75) Inventors: Gary T. Stone, Toronto (CA); Kim B. Crawford, London (CA); Nelson M. Lee, Mississauga (CA); Gin Liu, Brampton (CA); Johnny Fung, Mississauga (CA); Michael A. Campbell, Brampton (CA)

(73) Assignee: Nortel Networks Limited (CA)

( * ) Notice: Subject to any disclaimer, the term of this patent is extended or adjusted under 35 U.S.C. 154(b) by 946 days.

(21) Appl. No.: 10/417,321

(22) Filed: Apr. 16, 2003

Related U.S. Application Data

(60) Provisional application No. 60/389,007, filed on Jun. 14, 2002.

(51) Int. Cl.  
*H04L 12/56* (2006.01)

(52) U.S. Cl. .................................. 370/395.41; 370/252

(58) Field of Classification Search ............ 370/395.21, 370/395.32, 395.4, 395.41, 401, 402, 389, 370/252, 231, 235, 235.1  
See application file for complete search history.

(56) References Cited

U.S. PATENT DOCUMENTS

| | | | |
|---|---|---|---|
| 6,266,395 B1 | 7/2001 | Liu et al. | |
| 6,775,232 B1 * | 8/2004 | Ah Sue et al. | 370/230.1 |
| 6,895,041 B1 * | 5/2005 | Mccullough et al. | 375/222 |

\* cited by examiner

*Primary Examiner*—Brenda Pham  
(74) *Attorney, Agent, or Firm*—Anderson Gorecki & Manaras LLP

(57) ABSTRACT

Achieved bandwidths for existing subscribers are collected and organized into a statistical bandwidth table utilizing characterizing information, such as the Central Office (CO) that provided the service, the type of xDSL service that was provided, the primary, secondary, and other cable segments over which service was provided, and the subscriber loop length increment. To estimate anticipated bandwidth for a new subscriber, the new subscriber's characterizing information is obtained and used to select one or more entries from the statistical bandwidth table of statistical actual bandwidths achieved by other users that most closely matches the new subscriber's characterizing information. The statistical bandwidth information for the other similarly situated subscribers is used as an estimate bandwidth information for the new subscriber.

16 Claims, 4 Drawing Sheets

US 7,391,780 B1

METHOD AND APPARATUS FOR STATISTICAL PREDICTION OF ACCESS BANDWIDTH ON AN XDSL NETWORK

BACKGROUND OF THE INVENTION

1. Field of the Invention

The present invention relates to access network performance prediction and, more particularly, to a method and apparatus for predicting access bandwidth on an xDSL network.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or cells, frames, or segments) between the network devices by utilizing one or more communication links. A particular packet may be handled by multiple network devices and cross multiple communication links as it travels between its source and its destination over the network.

Consumers seeking to access a data communication network, such as the Internet, may utilize several technologies, such as a modem, cable modem, ISDN, Digital Subscriber Line (DSL) technology, or other conventional technologies. Several DSL technologies offer high-bandwidth services over existing twisted pair copper telephone wires commonly referred to as "subscriber loops." Such technologies include Asymmetrical DSL (ADSL), High-bit-rate DSL (HDSL), Rate Adaptive DSL (RDSL), Symmetric DSL (SDSL), and Very high speed DSL (VDSL). These, and other DSL-based technologies, will be referred to herein collectively as xDSL.

The bandwidth available over xDSL to a subscriber will vary depending on many factors, such as the distance between the subscriber and the central office (the terminating point on the provider side), the type of equipment deployed at the central office, other physical characteristics of the subscriber loop, and disturbers to the subscriber loop. A telecommunications company seeking to provide xDSL service to a subscriber may desire to obtain an estimate of likely bandwidths that it may be able to provide to the subscriber on a particular loop, depending on different xDSL deployment strategies (i.e. different inside wiring strategies and DSLAM configurations). Estimating the maximum bandwidth and other parameters associated with xDSL service on that loop may be used to enable the telecommunications provider to set correct expectations with the subscribers, and sell the correct service to the subscribers.

Several methods of estimating bandwidth on a subscriber loop have been proposed. One such method is disclosed in Liu, et al., (U.S. Pat. No. 6,266,395, entitled SINGLE-ENDED SUBSCRIBER LOOP QUALIFICATION FOR XDSL SERVICE) the content of which is hereby incorporated by reference. Liu, et al. disclose a method of providing a bandwidth estimate based on physical characteristics of the subscriber loop such as length, conductor size, cable insulation type, and the type of devices and services installed on the subscriber loop. Although Liu, et al. is able to get a good estimate, it would be advantageous to increase the accuracy to provide better estimates of likely available bandwidth for new xDSL subscribers.

SUMMARY OF THE INVENTION

The present invention overcomes these and other drawbacks by providing a mechanism to allow bandwidth estimation to utilize network experience during the estimation process so that xDSL service bandwidth availability estimates may incorporate statistical results from ongoing service as well as theoretical predictions. Additionally, the rate of bandwidth predictions may be accelerated since the prediction, according to an embodiment of the invention, utilizes table lookups rather than potentially computationally intensive estimation based on electrical measurements and theoretical bandwidth models.

According to one embodiment of the invention, bandwidth records for existing subscribers are collected and organized into a bandwidth database. These bandwidth records are used to create a statistics database containing statistic records of bandwidths achieved by subscribers with particular characterizing information. The characterizing information may include items such as the Central Office (CO) that provided the service, the type of xDSL service that was provided, the cable segments over which service was provided, and the subscriber loop length increment.

When the available bandwidth is to be estimated for a new subscriber or a new service is to be provided to an existing subscriber (collectively new subscriber), the new subscriber's characterizing information is obtained and used to select one or more entries from the statistical bandwidth table that most closely match the new subscriber's characterizing information. The average or other statistically significant bandwidth information for subscribers with the same or nearly the same characterizing information is used to estimate the bandwidth likely to be able to be provided to the new subscriber. Utilizing statistical bandwidth information enables the bandwidth estimation to account for average inside wire effects (effects occurring within the subscriber's premises) to enable more accurate predictions to occur.

As actual bandwidth values are collected over time the predictions self-adjust towards the "consensus estimates" within each neighborhood. Additionally, with regeneration of predictions tables periodically, any network/subscriber grooming activities will be captured and reflected in future predictions. In this sense, the algorithm is self-improving as it adapts for network rollout of broadband services and automatically captures new services as they are deployed on the network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
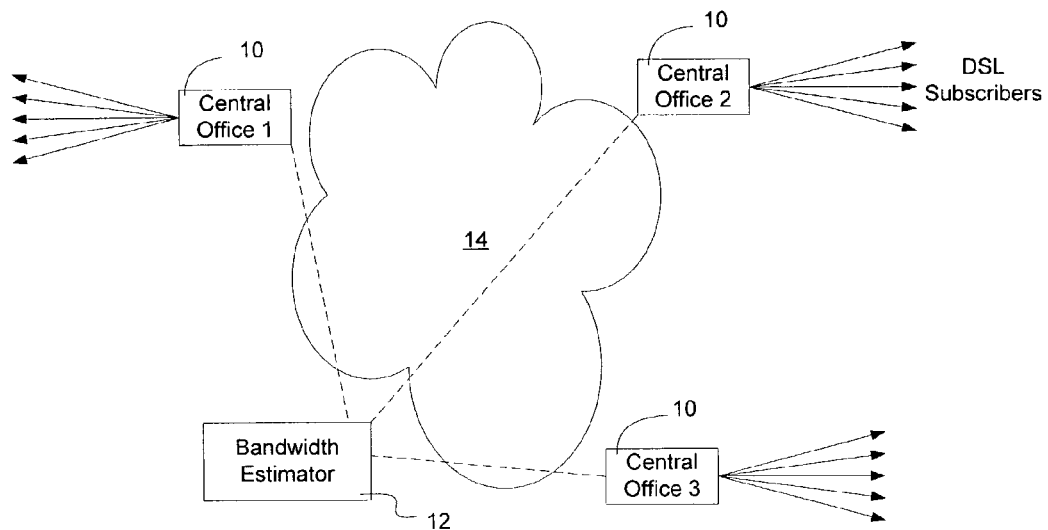
FIG. 1 is a functional block diagram of a network architecture incorporating a bandwidth estimator according to an embodiment of the invention.

FIG. 1 illustrates a functional block diagram of a network architecture incorporating a bandwidth estimator according to an embodiment of the invention. As shown in FIG. 1, a network service provider may have many central offices 10 configured to provide xDSL service to xDSL Subscribers. In one embodiment, xDSL estimation services are provided to the Central Offices 10 by a bandwidth estimator 12. The bandwidth estimator 12 may be located on the network 14 in a convenient location, such as at the service provider's headquarters or at another convenient location on the network. Alternatively, the bandwidth estimator may be pushed out to reside in the various central offices 10. The invention is not limited by the location of the bandwidth estimator 12 on the network 14.

Figure 2:
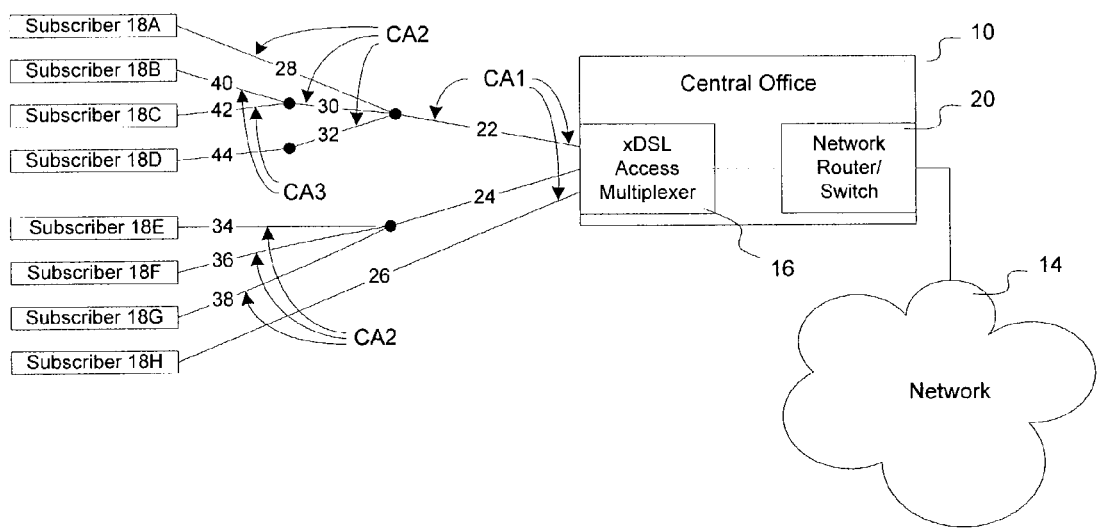
FIG. 2 is a functional block diagram of a central office configured to provide xDSL services to subscribers according to an embodiment of the invention.

As shown in FIG. 2, each central office 10 that is configured to provide xDSL service will generally have an xDSL Access Multiplexer (DSLAM) 16 configured to interface with xDSL subscribers 18A-H, and a network router/switch 20 or other network device configured to pass traffic onto the network 14 and receive traffic from the network 14 destined for xDSL subscribers 18.

Service to xDSL subscribers 18A-H may be provided over one or more shared or private cable segments. The cable segment closest to the DSLAM will be referred to as the primary cable segment (CA1). The cable segment connected to the end of the primary cable segment will be referred to herein as the secondary cable segment (CA2). Depending on the network configuration, third, fourth, or any number of additional cable segments may be present to provide xDSL service to subscribers. While the invention will be described herein in connection with utilizing statistics from the primary and secondary cable segments, the invention is not limited to this embodiment but rather extends to utilizing statistics from any number of cable segments. The cable segments contain many wires, pairs of which form a subscriber loop for a particular subscriber.

FIG. 2 illustrates a simplified tree architecture in which xDSL subscribers are connected to the DSLAM via various primary, secondary and tertiary cable segments. Specifically, as shown in FIG. 2, xDSL subscribers 18A-D all share primary cable segment 22, xDSL subscribers 18E-G share primary cable segment 24, and xDSL subscriber 18H is provided with service over primary cable segment 26. In this example xDSL subscriber 18A is on secondary cable segment 28, xDSL subscribers 18B and 18C share secondary cable segment 30, and xDSL subscriber 18D is provided with service on secondary cable segment 32. xDSL subscribers 18E-G are provided with service on secondary cable segments 34, 36, and 38, respectively. Optionally, tertiary cable segments 40, 42, 44 may be used as well to connect xDSL subscribers to the DSLAM 16. The invention is not limited to this particular example which was simply used to illustrate one way of identifying cable segments on the network.

According to one embodiment of the invention, bandwidth estimation for a new xDSL subscriber on a presently unprovisioned subscriber loop utilizes bandwidth statistics of other subscriber loops to arrive at a bandwidth estimate for the subscriber loop. In one embodiment, a bandwidth estimation procedure includes three parts: gathering actual bandwidth data, building statistical prediction tables based on actual bandwidth data, and using the prediction tables as bandwidth predictors to estimate likely bandwidth availability for other subscriber loops. The invention is not limited to this particular embodiment, however, as other methods of utilizing statistics to predict bandwidths may be used as well.

Gathering Actual Bandwidth Data

To enable bandwidths for unprovisioned subscriber loops to utilize statistical information, the actual bandwidths being provided to existing xDSL subscribers must be collected. According to one embodiment of the invention, this actual bandwidth information is collected and stored as bandwidth records in a bandwidth database. The bandwidth database may be an existing database, such as a database of customer records maintained by the service provider, or may be a stand-alone database.

Figure 3:
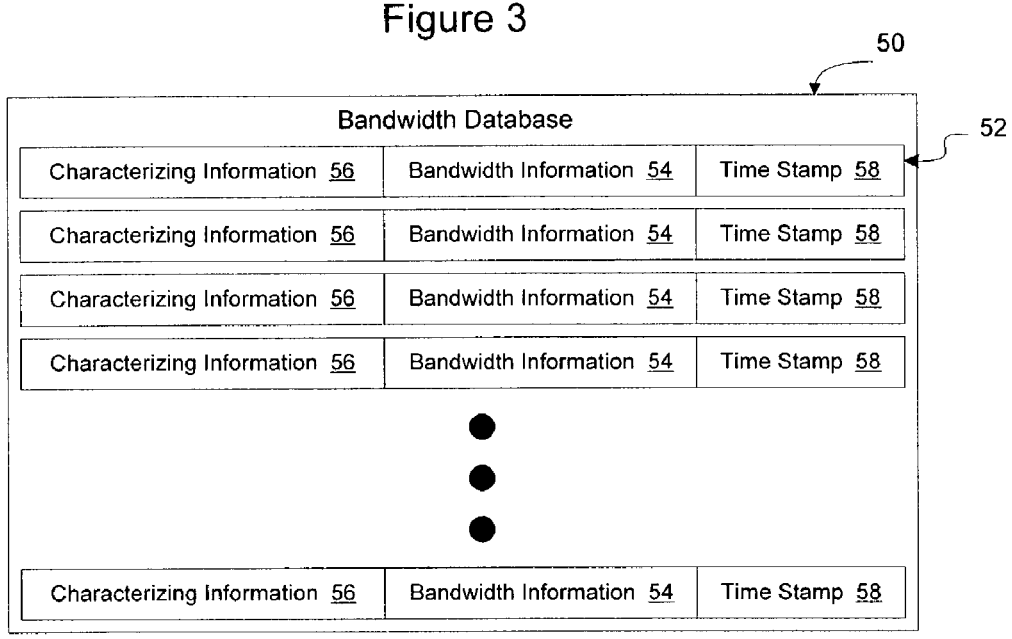
FIG. 3 is a functional block diagram of a bandwidth database containing bandwidth records organized according to an embodiment of the invention.

One example of a bandwidth database is illustrated in FIG. 3. As illustrated in FIG. 3, a bandwidth database 50 contains bandwidth records 52. The bandwidth records 52 may contain different types of bandwidth information 54 of interest to service providers, such as the maximum downstream bandwidth, the minimum downstream bandwidth, the maximum upstream bandwidth, the minimum upstream bandwidth, or any other measurable parameters associated with service to the xDSL subscriber. Where the service provider's existing customer database is used as the bandwidth database, the bandwidth records may be formed as entries in the customer records that have been created in the existing database. In this embodiment, the bandwidth records may be retrieved utilizing whatever entry retrieval mechanism is utilized to access information in the existing database.

The bandwidth records 52 also contain characterizing information 56 and time stamp information 58. The characterizing information 56 is used by the bandwidth estimator at a later time to enable it to identify similar customers for creation of statistical bandwidth records, and to more closely align a particular proposed subscriber with relevant bandwidth information to enable it to provide a more accurate bandwidth estimate. Examples of characterizing information that may be collected include the Network Equipment Identifier (NEI code) assigned to the equipment at the central office providing the service, the type of service being provided (i.e. the type of xDSL service instantiated, the manufacturer of the network device providing the service, and the model type of the network device), the identity of the primary cable segment (CA1) and secondary cable segment (CA2) over which service was provided, and the approximate length of the subscriber loop over which service is being provided. The invention is not limited to this particular set of characterizing information, as additional or alternative characterizing information may be collected as well. For example, the characterizing information may include data on additional cable segments CA3, CA4, etc., and the invention is not limited to only utilizing two cable segments. Additionally, often a full complement of characterizing information may not be available for a particular user. In this instance, the characterizing information will include that information which is available.

The length of the subscriber loop may be calculated based on loop capacitance measurement and published capacitance tables available from the cable manufacturers. Any other subscriber loop length measurement method may be used as well and the invention is not limited to any particular method of measuring the loop length. If desired, a theoretical bandwidth may be collected as well to enable comparisons to be made between the theoretical and observed bandwidth metrics to be used to screen out rogue data or to be used in the bandwidth estimation process.

The bandwidth records 52 also contain a time stamp to enable records to be created and updated within the table and to allow recently modified records to be distinguished from records that have already been used to generate bandwidth statistics.

Initially, if it is desired to start utilizing bandwidth statistics, the bandwidth estimator will need to create bandwidth records for xDSL subscribers. These bandwidth records may be stored in a separate bandwidth database or may be stored as entries in existing customer records in an one or more established databases. When a bandwidth record is first created the time stamp is set to whenever the record was created. Subsequently, whenever a new bandwidth record is created, the time stamp 58 is updated to indicate the time at which bandwidth record was created, so that recent new information may propagate through the bandwidth estimation process.

Bandwidth records containing current bandwidth information are collected from subscribers on an on-going basis. Network service providers providing xDSL service to an existing subscriber base may collect bandwidth statistics on existing subscriber loops using any number of conventional techniques. For example, a background process to gather the bandwidth statistics may be scheduled to run periodically to build a database of information related to service being provided to existing subscribers. This process may be run weekly, monthly, or at any other convenient increment to maintain up-to-date information in the database. The invention is not limited to any particular method of updating bandwidth records.

Compile Statistical Bandwidth Data

Figure 4:
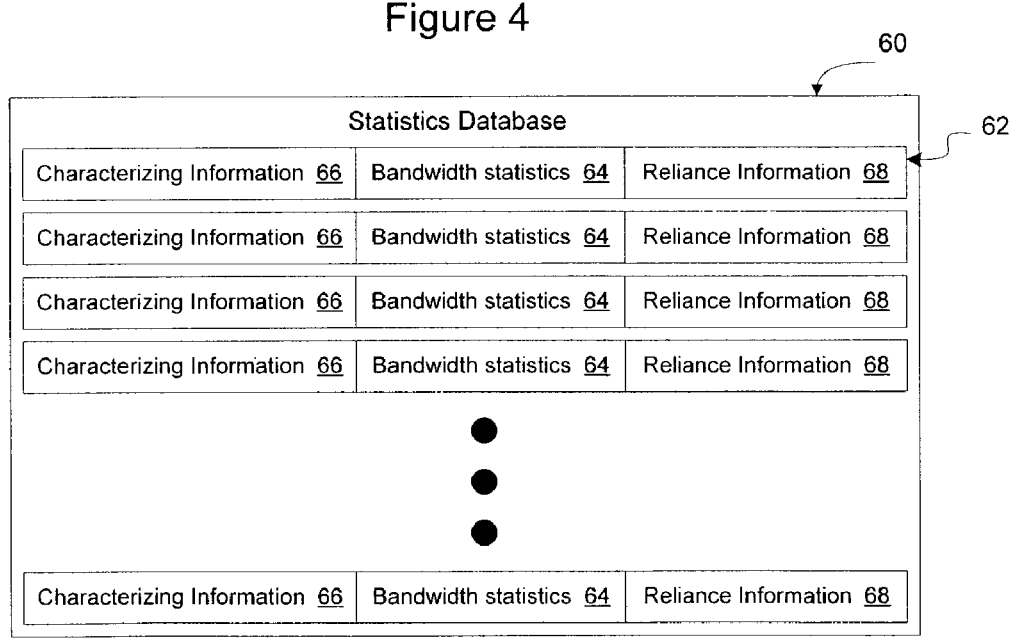
FIG. 4 is a functional block diagram of a statistics database containing statistic records organized according to an embodiment of the invention

The actual bandwidth data contained in the bandwidth records of the bandwidth database may be used to predict/estimate bandwidth for new subscribers. However, since the actual bandwidth may vary considerably from subscriber to subscriber depending on the particular characteristics of the subscriber loop, another approach is to cull statistics from the actual data, and use the statistics during the estimation phase (described below). The statistics may be stored in a statistics database or other convenient construct, one example of which is illustrated in FIG. 4.

The statistics database 60 contains records of statistics of the types of bandwidth services a particular central office has historically provided to subscribers. As shown in FIG. 4, the statistics database 60 contains statistic records 62, each of which contains bandwidth statistics 64 associated with subscribers with the same or similar characterizing information 66. Including the characterizing information in statistic records enables the statistic record to be located when a new subscriber with the same or similar characterizing information seeks xDSL service. The statistic records 62 also include reliance information 68, such as time stamps and the number of bandwidth records that were used to create the statistic record 62.

Statistics records 62 may be updated periodically or on demand to capture new bandwidth information in bandwidth records 52 from the bandwidth database 50. When it is desired to obtain or update a set of statistics records 62, such as for a given central office 10, the administrator will specify what statistics are to be gathered by entering the Network Equipment Identifier (NEI) code for the central office (each central office has a unique NEI code), the type of service that is of interest (e.g. what type of xDSL to look at), and any restrictions, such as a recency restriction (don't look at statistics older than x days).

Upon receipt of a request, a Statistical Bandwidth Generator (SBG) (see FIG. 6) will look at all bandwidth records 52 in the bandwidth database 50 for subscribers serviced by the identified Central Office that are provided with the identified type of service. The SBG will retrieve other characterizing information such as cable information (CA1 and CA2) for the subscribers and find all actual bandwidth records with a time stamp newer than a recency restriction input by the administrator or otherwise associated with the update. From the available actual bandwidth records, the SBG will select reliable records by applying screening rules to eliminate bandwidth records that contain bandwidths that are not in line with expectations by being either exceptionally high or exceptionally low. This allows the SBG to ignore bandwidths that are out of bounds from a pre-defined screening template. In one embodiment, the lowest and highest downstream and upstream bandwidths are maintained for each subscriber loop length increment. For example, a SYSTEM table may be created, having subscriber loop increments of 500 feet, and defining for each subscriber loop length the maximum and minimum bandwidths in both the upstream and downstream directions. Actual bandwidth measurements in excess of the maximum or lower than the minimum may be discarded to prevent rogue data from causing the creation of erroneous and unreliable statistics records 62.

Once a set of reliable bandwidth records has been obtained, the SBG determines the maximum actual bandwidth for a particular subscriber. In making this determination, the relative capacity of the subscriber loop must be taken into account since the subscriber may have elected not to pay for the maximum allowable bandwidth that may be delivered over the cables. Thus, the bandwidth received by the user does not fully account for the total amount that could have been provided to the user by the network. The actual bandwidth may be calculated as (bandwidth/relative capacity)*100%, although the invention is not limited to this embodiment. For example, assume that a subscriber has subscribed to 1 Megabit/sec (1 M) service, and the set of cables is capable of providing 5 M service. In this instance the subscriber is only utilizing 20% of the available capacity on the link. If the subscriber is actually receiving 1 M service over the link, the maximum capacity may be calculated as (1 M/20%) *100%=5 M. The 5 M value will be used in the statistics calculation for that subscriber. Optionally, the normalization process may be performed in connection with generating bandwidth records 52 and normalized bandwidths may be stored in the bandwidth records.

After ascertaining the maximum actual bandwidth for the subscriber, the SBG retrieves the latest valid estimated loop length. During this retrieval process the SBG may apply restrictions to screen out invalid loop lengths (such as loop lengths <0). The process may also ignore records having loop lengths computations that are older than a predetermined age.

It may be beneficial to round the retrieved loop length for a particular bandwidth record to a set increment, e.g. nearest largest 500 foot increment. For example, the statistical data will be used by an estimation program (described below) to estimate what bandwidth values may be expected on a particular subscriber loop. Classifying the loop lengths in 500 foot or some other convenient intervals enables the tables to be kept to a relatively smaller size than if no rounding was performed. Additionally, classifying the loop lengths according to interval size rather than according to actual size causes more entries to fall within each interval, thus helping to populate the table more fully and increasing the reliability of the statistical bandwidths in the statistics database.

Once the loop length has been retrieved, the SBG checks the statistics database 60 to see if there is an existing statistic record for the same service, same set of cables CA1 and CA2, and same loop length range. If there is an entry, the SBG calculates a new average ((old average*number of subscribers in old average)+new bandwidth) divided by (number of subscribers in old average+1). The new average is used by the SBG to replace the old entry and the number of subscribers field (in the reliance information 68) is incremented by 1. Any other relevant statistic may be used instead of the average, such as the mean bandwidth, the standard deviation, or any other statistic that may be useful in estimating bandwidths for a new user. Additionally, other methods of calculating the average or updating the calculations may be utilized and the invention is not limited to this particular illustrated embodiment. The invention will be described using averages as the example statistic, but the invention is not limited to this embodiment. If no entry exists for the particular service, cables, and loop length, a new entry is created and the number of subscribers having that particular characterizing information will be set to 1.

There are several possible ways to avoid counting updated subscriber records as new subscribers. One way is to include a flag in the customer record or bandwidth record that indicates that the subscriber has already been included in the statistics database. Alternatively, subscriber identification information or a pointer to another database containing subscriber identification information may be included in the statistics database. In either embodiment the subscriber identification information may contain information about the identity of subscribers that were used to create the statistical entry, and any other information that may be useful in connection with providing service or marketing new services to the subscribers.

Maintaining customer identification information, and optionally other portions of the raw bandwidth information or characterizing information, has an added benefit of allowing a service provider to easily identify customers that are provided with similar service. This may be useful, for example, when troubleshooting problems on the network, for directed advertising, or any other number of applications.

Table I shows one example of the type of information that may be collected and stored in statistic records 62. In Table I, the first five fields are characterizing information, the next seven fields are bandwidth information, and the final field contains time stamp information. The invention is not limited to bandwidth records with this example structure.

The SBG also creates and updates other entries in the statistics table that may be used by the bandwidth estimator (described below) to estimate bandwidth that may be provided to a new subscriber. Specifically, in one embodiment, the SBG performs the same process (1) for entries with the same service type, same central office, and same primary cable segment, and (2) for entries with the same service type and central office, regardless of cable segment. Creating three entries allows (as discussed in greater detail below) the bandwidth estimator to estimate available bandwidth for a new subscriber using bandwidth statistics for other subscribers that also have: (1) the same CO, same primary cable segment, and same secondary cable segment; (2) the same CO and primary cable segment; or (3) the same CO and no common cable segments. Statistical entries for subscribers with the same CO and primary cable segment include subscribers that have different secondary cable segments or no secondary cable segment. Similarly, statistical entries for subscribers with the same CO includes all statistical bandwidth for the CO regardless of what cable segments are used to provide the service. This allows the bandwidth estimator to discern between available statistics to use the statistics from existing service to estimate available service parameters for other/new subscribers.

Table II illustrates an example of a statistics database containing example statistic records.

TABLE 1

| Field | Description |
| --- | --- |
| NEI code | Common Language Location Identifier (CLLI) code for this Central Office<br>Or template name<br>Or SYSTEM |
| Service Type | e.g. type of xDSL service, manufacturer of network device, and network device model number |
| CA1 | Cable ID of the primary cable segment |
| CA2 | Cable ID of the secondary cable segment. Some subscribers may not have a secondary cable segment. |
| CA3, CA4, . . . CAn | Cable IDs of additional cable segments. Some subscribers may not have additional cable segments. |
| Max_loop_length_group | Max. loop length within this group. Each group differs by 500 ft, e.g. 9000, 9500, 10000, 10500, etc. |
| Max_down_speed_actual | Maximum downstream bandwidth. If the NEI code is SYSTEM, the value is used to screen out unreasonable bandwidth entries. |
| Min_down_speed_actual | Minimum downstream bandwidth. If the NEI code is SYSTEM the value is used to screen out unreasonable bandwidth entries. |
| Max_up_speed_actual | Max upstream bandwidth. If the NEI code is SYSTEM, The value is used to screen off un-reasonable bandwidth entries. |
| Min_up_speed_actual | Min up stream bandwidth. If the NEI code is SYSTEM, the value is used to screen off un-reasonable bandwidth entries. |
| Ave_down_speed_actual | Average of actual downstream bandwidth queried from EMS. For each subscriber, find the actual bandwidth and average out for the same loop length group. The down stream bandwidth includes the effect of the relative capacity. For example, if the queried bandwidth is 1 M and the relative capacity is 50%, the bandwidth will be 2 M. |
| Ave_up_speed_actual | Similar to Ave_down_speed_actual but it is for upstream bandwidth. |
| Num_subscriber | Number of subscribers with EMS actual bandwidths. |
| Timestamp | Timestamp when this entry was last updated |

TABLE II

| | Characterizing Information | | | | | | Bandwidth Statistics | | | | Reliance Information | |
|---|---|---|---|---|---|---|---|---|---|---|---|---|
| NEI Code | Service | CA1 | CA2 | Max loop length (ft) | Max Down Stream (Kb) | Min Down Stream (Kb) | Ave Down stream (Kb) | Max Up Stream (Kb) | Min Up Stream (Kb) | Ave Up Stream (Kb) | # of subscribers | Time Stamp |
| DMUSIM | ADSL | | | 11500 | 6578 | 842 | 4095.75 | 964 | 182 | 618.65 | 81 | 200201011305 |
| DMUSIM | ADSL | | | 12000 | 6578 | 552 | 3667.78 | 853 | 79 | 597.54 | 51 | 200206240105 |
| DMUSIM | ADSL | | | 13000 | 6232 | 762 | 3373.22 | 800 | 436 | 606.06 | 36 | 200208020635 |
| DMUSIM | ADSL | 19 | | 11500 | 5638 | 1455 | 3637.33 | 667 | 457 | 588 | 3 | 200303011509 |
| DMUSIM | ADSL | 21 | | 11500 | 6232 | 1000 | 4281.3 | 667 | 457 | 620.54 | 13 | 200212250300 |
| DMUSIM | ADSL | 21 | | 12000 | 5638 | 552 | 3382.57 | 800 | 457 | 611.57 | 7 | 200302031522 |
| DMUSIM | ADSL | 21 | | 13000 | 6232 | 889 | 3323.86 | 727 | 436 | 605.29 | 7 | 200211080202 |
| DMUSIM | ADSL | 19 | 1243 | 11500 | 5638 | 1455 | 3637.33 | 667 | 457 | 588 | 3 | 200302192200 |
| DMUSIM | ADSL | 21 | 123-4 | 11500 | 5382 | 1000 | 4118.75 | 667 | 457 | 618.92 | 12 | 200209300101 |
| DMUSIM | ADSL | 21 | 123-5 | 11500 | 5638 | 1067 | 4318.33 | 711 | 480 | 627.33 | 9 | 200311010902 |
| DMUSIM | ADSL | 21 | 123-5 | 12000 | 4083 | 2077 | 3012.12 | 696 | 615 | 641.75 | 8 | 200304091111 |
| DMUSIM | ADSL | 21 | 123-5 | 13000 | 3947 | 3289 | 3618 | 571 | 552 | 561.5 | 3 | 200205050203 |
| TEMPLATE 1 | ADSL | | | | 3000 | | 8128 | | | 832 | | |
| TEMPLATE 1 | ADSL | | | | 14000 | | 40000 | | | 832 | | |
| SYSTEM | ADSL | | | | 12000 | 6750 | 457 | | 8500 | 0 | | |
| SYSTEM | ADSL | | | | 12500 | 6500 | 229 | | 8500 | 0 | | |

In Table II, the first 3 entries are for the CO, the next 4 are for CA1 and the next 5 are for individual cables (CA1 and CA2). The last few entries illustrate the template entries and SYSTEM entries. The template entries are experimentally determined by a service provider or other entity for the particular service being provided, and can be used as a default where no match can be found with CO/CA1/CA2, CO/CA1 or CO. The SYSTEM entries are used to screen off entries with un-reasonable actual bandwidths due to some special line conditions. Valid upstream and downstream bandwidth values must fall within the maximum and minimum values specified by the SYSTEM entries.

Template tables are generated to provide prediction values for various types of xDSL service. A template generation program obtains High Speed Access (HSA) NEI parameters from HSA NEI tables and generates templates based on current tuned parameter setups. The HSA NEI tables are maintained by service providers and contain information such as the cable gauge range (e.g. 24-26 gauge wire), the filling of the cable (e.g. aircore or jelly filled cable), the insulation type, and other useful information. The templates are included with the SBG to enable it to provide default information when statistical information is not available for a particular subscriber loop. Any number of templates may be provided and the invention is not limited to utilization of any particular method of generating or utilizing template values.

A system table containing SYSTEM entries is included in the SBG and contains maximum and minimum bandwidths for service over particular loop lengths that may be provided by a CO. According to one embodiment, the SYSTEM entries are standard/common for all COs. The SYSTEM entries may be different for different loop lengths, different types of service, and other configurable parameters. The SYSTEM entries may be altered by an administrator as needed and as service bandwidths continue to change.

A graphical user interface (GUI) is provided to allow table entries to be updated/modified by an administrator. This enables the administrator to take action to screen out undesirable entries by modifying the SYSTEM entries, or to take other actions deemed necessary on the database.

Bandwidth Prediction

Once the statistics database 60 has been created and/or updated, it may be used to predict transmission parameters such as upstream and downstream bandwidths on other subscriber loops. Typically, when a new subscriber wishes to obtain xDSL service or a provider wishes to entice a new subscriber to purchase xDSL service, one of the initial things the service provider will do is seek to ascertain what sort of service it can offer the new subscriber. One key component of this is to ascertain how much bandwidth is likely to be available over the particular subscriber's subscriber loop. This may be estimated by testing electrical characteristics of the subscriber loop and using theoretical models that have been designed to predict, based on those electrical characteristics, the likely bandwidth available on the subscriber loop. According to one embodiment of the invention, statistical bandwidths of other subscribers may be used to supplement or supplant the estimation to obtain a more reliable/realistic bandwidth estimate.

The bandwidth estimator 12 provides an estimated bandwidth in response to a query about a proposed subscriber with identified characterizing information. Specifically, an operator or other program construct may enter a query containing a new subscribers phone number or other identifier to enable characterizing information about the subscriber to be ascertained. The characterizing information may be obtained from the customer record for that subscriber and contain information such as the NEI code of the equipment at the central office that will be providing xDSL service, the type of xDSL service to be provided, the cable segments (CA1 and CA2) over which service will be provided and the subscriber loop length or loop length increment for the subscriber. The bandwidth estimator 12 uses this information to obtain an initial estimate of likely available bandwidth for the particular subscriber loop by accessing records in the statistics database 60. The estimation may be performed by a subroutine or functional module such as Bandwidth Predictor (BP) 78 (see FIG. 6) although the invention is not limited to this embodiment.

Figure 5:
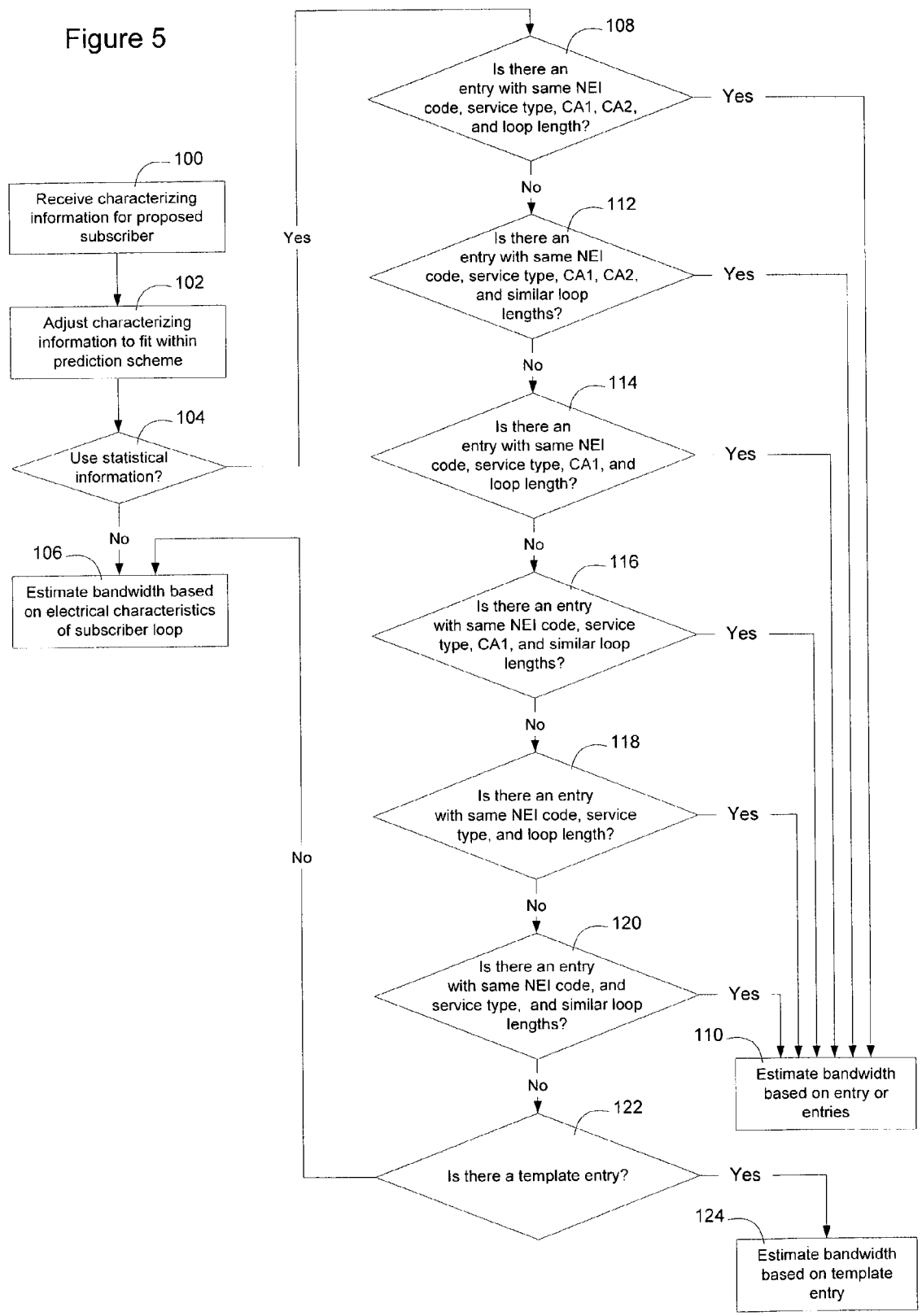
FIG. 5 is a flow chart of an example of software that may be used to implement embodiments of the invention.

FIG. 5 illustrates a flowchart of one example of software configured to implement a bandwidth prediction according to an embodiment of the invention. As shown in FIG. 5, upon receipt of characterizing information for a proposed subscriber 100, the characterizing information is adjusted to enable it to be used in the instantiated prediction scheme 102. For example, it may be necessary to adjust the subscriber loop length to the next largest interval according to the subscriber loop length interval selected to be implemented on the particular system. Other adjustments may also be necessary depending on how the new subscriber characterizing information was obtained.

A determination is then made as to whether statistical information is to be used to provide a bandwidth estimation for this user 104. If the network administrator has elected not to use statistical bandwidth estimation, one or more conventional formulas may be used to calculate an estimated bandwidth based on electrical characteristics of the subscriber loop. This allows conventional methods to be used concurrently with the statistical method 106.

If statistical bandwidth estimation is to be utilized, the statistic database 60 is searched for an entry having the same NEI code, xDSL service type, cable information (CA1 and CA2), and loop length range 108. Optionally, the BP 78 may only accept entries that have more than a predetermined number of subscribers, e.g. greater than 3, to avoid utilizing an unacceptably small sampling as a predictor. For example, it may be that only one other user is provided with the particular type of xDSL service from a given CO over a specific pair of cables CA1 and CA2. In this instance, it may be unreliable to expect that the second user would obtain exactly the same service as the first user, since service for particular subscribers may vary for many reasons. By contrast, an entry with a large number of subscribers provides a much more reliable estimate since some of the particular anomalies of the network are diminished by averaging over a larger sampling. Thus, the reliability information in the statistics records may be used to allow the bandwidth predictor to achieve a certain confidence level in the statistical result obtained from the statistics database, and ignore statistical results with an insufficient level of reliability.

If an acceptable entry is found, the BP uses the entry to predict the likely bandwidth for the new xDSL subscriber 110. The BP may select the downstream and upstream bandwidths as the predicted bandwidths for the new xDSL subscriber, or may use the retrieved bandwidth information to adjust an estimated bandwidth calculated from electrical characteristics of the subscriber loop.

If an entry is not found for the particular CO, service type, CA1 and CA2, the BP checks to see if there are immediate neighbors, e.g. one or more entries for the same NEI code, service, primary and secondary cables, but with a slightly longer loop length group and a slightly shorter loop length group 112. If both neighbors are found, the BP averages the downstream bandwidths for the neighbors and uses the average of the neighbors as the predicted downstream bandwidth estimate for the new xDSL subscriber, and the BP averages the upstream bandwidths for the neighbors and uses the average of the bandwidths from the neighbors as the predicted upstream bandwidth for the new xDSL subscriber. Using the average bandwidth provided to neighbors is reasonable since the bandwidth available on a particular set of cables is likely to approximate a relatively linear relationship over a short length interval, e.g. 1000 feet.

In the illustrated embodiment, neighbors on both sides of the target entry have been used as an example of how it may be possible to interpolate an estimation from other table entries where the particular entry of interest does not exist or is not sufficiently reliable. The invention is not limited to this one particular interpolation method, but rather extends to other interpolation methods as well. For example, two entries on either side of the target entry may be able to provide an indication of how bandwidth is decreasing with distance from the CO which may be used to interpolate an estimated bandwidth as well. Accordingly, the invention is not limited to the illustrated embodiment but extends to other interpolation methods as well. Additionally, in the above embodiment interpolation is performed while estimating a bandwidth for a new subscriber. In another embodiment, interpolation may take place on the statistics database after statistic records have been created, and the interpolated results may be stored in the statistics database. Creating interpolation entries on the statistics database enables interpolation to be performed once for a given entry and may accelerate resolution of bandwidth estimates. Optionally, an interpolation flag may be included in the reliance information to enable interpolated entries to be distinguished from other entries.

If there are insufficient neighbor entries to interpolate a result, the BP will look to see if there is an entry with the same NEI code, service type, primary cable segment CA1, and subscriber loop length interval 114. The BP may require the entry to contain information from a number of subscribers before accepting it as legitimate. The number of entries required to accept information as reliable may be the same throughout the process of attempting a statistical bandwidth estimation, or may increase as the information used to predict the likely bandwidth gets less closely related to the specific service to be provided to the new subscriber.

If there is an entry of this nature, the BP will use the entry to predict the estimated upstream and downstream bandwidth available for the new xDSL subscriber 110. If this entry does not exist, the BP will attempt to interpolate a value from neighbors with the same NEI code, service type, and primary cable segment, but with slightly different loop lengths 116. If adequate neighbors exist, the entries are averaged or the bandwidth is otherwise calculated from these entries to ascertain predicted bandwidth values for the new subscriber 110.

If the statistic table does not contain neighbor entries, the BP will look for an entry with the same NEI code, same service, and same loop length, but with no cable information (No CA1 or CA2 entry) 118. If the statistic table has a matching entry, the BP will use the bandwidth values in the entry to ascertain the maximum upstream and downstream values for the new subscriber's prediction 110. If there is no matching entry, the BP will attempt to interpolate from neighboring entries to ascertain the predicted value for the new xDSL subscriber 120.

If there is no statistic entry or combination of statistic entries that may be used to estimate a likely bandwidth for the new subscriber, the bandwidth predictor will look for a template entry 122. If a suitable template entry is found, the template entry is used to predict the new subscriber bandwidth estimate 122. If no template has been assigned to this CO, theoretical bandwidth prediction algorithms may be used to predict the likely bandwidth for the new xDSL user 106.

Figure 6:
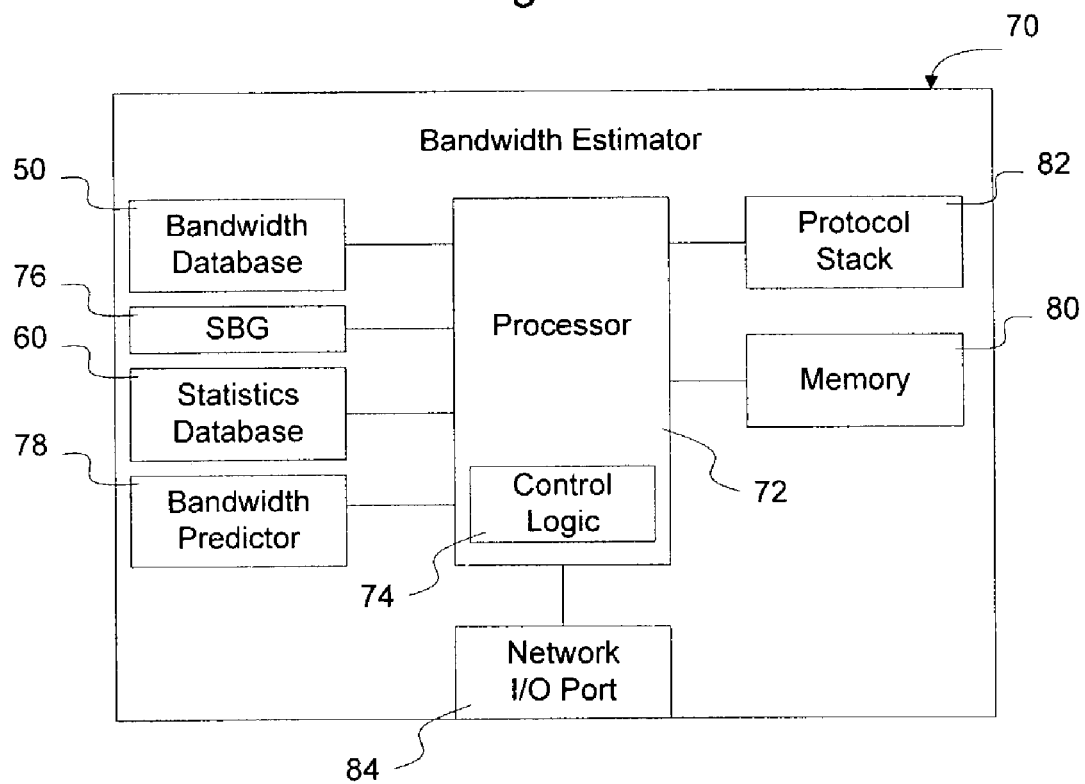
FIG. 6 is a functional block diagram of a Bandwidth Estimator configured to provide bandwidth estimation services to central offices according to an embodiment of the invention.

FIG. 6 illustrates a network device implementing a bandwidth estimator according to an embodiment of the invention. As shown in FIG. 6, the network device 70 contains a processor 72 having control logic 74 configured to implement the functions ascribed to the bandwidth estimator 12 as described above in connection with FIGS. 1-5.

The network device 70 includes bandwidth database 50 containing resource records 52, a statistical bandwidth generator 76 configured to generate statistic records 62 for inclusion in statistics database 60, and a bandwidth predictor 78 configured to utilize the statistics database 60 to estimate or predict bandwidth values of xDSL service for new subscribers. A memory 80 and a protocol stack 82 containing instructions and data relevant to common communications protocols may be provided to facilitate communication with other network devices over one or more communications ports 84. One or more of the databases 50, 60, may be housed by the network device 70 or stored in another network device and accessed by the network device 70.

The control logic of FIG. 6 may be implemented as a set of program instructions that are stored in computer readable memory 80 within the network device and executed on a microprocessor within the network device. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. For example, the above embodiments have largely focused on utilizing actual bandwidths to the exclusion of theoretical bandwidths. Optionally, theoretical bandwidths may be calculated for each subscriber and the difference between theoretical and actual bandwidths may be utilized in predicting potential bandwidths for other likely subscribers. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of estimating access bandwidth on a network, the method comprising the steps of:
   obtaining bandwidth records for xDSL service provided to existing xDSL subscribers, the bandwidth records contain characterizing information of the existing xDSL subscribers;
   creating bandwidth statistics records from bandwidth records of subscribers with similar characterizing information; and
   predicting, based on the bandwidth records, an estimated bandwidth for a new xDSL subscriber;
   wherein the step of predicting comprises ascertaining characterizing information of the new xDSL subscriber; and estimating the estimated bandwidth from one of the bandwidth statistics records that was created from bandwidth records of subscribers having characterizing information similar to the new xDSL subscriber.

2. The method of claim 1, wherein the characterizing information comprises at least one of a Network Equipment Identifier (NEI) code, a service type, a primary cable segment, a secondary cable segment, and a subscriber loop length increment.

3. The method of claim 1, wherein the characterizing information comprising a subscriber loop length increment for the subscriber.

4. The method of claim 1, wherein the characterizing information comprises a central office indicator, primary cable segment, and secondary cable segment.

5. The method of claim 1, wherein the bandwidth statistics records contain bandwidth information, the bandwidth information comprising at least one statistic about bandwidths obtained by subscribers with similar characterizing information.

6. The method of claim 5, wherein said at least one statistic comprises an average bandwidth obtained by said subscribers with similar characterizing information.

7. The method of claim 6, wherein said average is at least one of an average of individual maximum bandwidths obtained by said subscribers and an average of individual minimum bandwidths obtained by said subscribers.

8. The method of claim 5, wherein at least a portion of said bandwidth information comprises template data containing default values for likely bandwidths achievable by a subscriber.

9. The method of claim 5, wherein at least a portion of said bandwidth information comprises system data containing limitations of achievable bandwidths achievable by subscribers.

10. The method of claim 1, wherein the bandwidth statistics records further comprise identification information.

11. The method of claim 1, wherein the bandwidth statistics records further contain and reliance information.

12. A method of estimating access bandwidth on a network, the method comprising the steps of:
    obtaining bandwidth records for xDSL service provided to existing xDSL subscribers, the bandwidth records contain characterizing information of the existing xDSL subscribers;
    creating bandwidth statistics records from bandwidth records of subscribers with similar characterizing information; and
    predicting, based on the bandwidth records, an estimated bandwidth for a new xDSL subscriber;
    wherein the step of predicting comprises ascertaining characterizing information of the new xDSL subscriber; and estimating the estimated bandwidth by interpolating from bandwidth statistics records that were created from bandwidth records of subscribers having characterizing information similar to the new xDSL subscriber.

13. The method of claim 12, wherein the characterizing information comprises a central office indicator and primary cable segment.

14. The method of claim 12, wherein the characterizing information comprises a network equipment identifier and service indicator.

15. A method of estimating access bandwidth on a network, the method comprising the steps of:
    obtaining bandwidth records for xDSL service provided to existing xDSL subscribers, the bandwidth records contain characterizing information of the existing xDSL subscribers; and
    predicting, based on those bandwidth records, an estimated bandwidth for a new xDSL subscriber;
    wherein the characterizing information comprising a subscriber loop length increment for the subscriber; and
    wherein the subscriber loop length increment is established by increasing an estimated subscriber loop length to a nearest preset increment value.

16. The method of claim 15, wherein the estimated bandwidth comprises at least one of an average bandwidth, a maximum bandwidth, and a minimum bandwidth.

* * * * *